Figure 1:
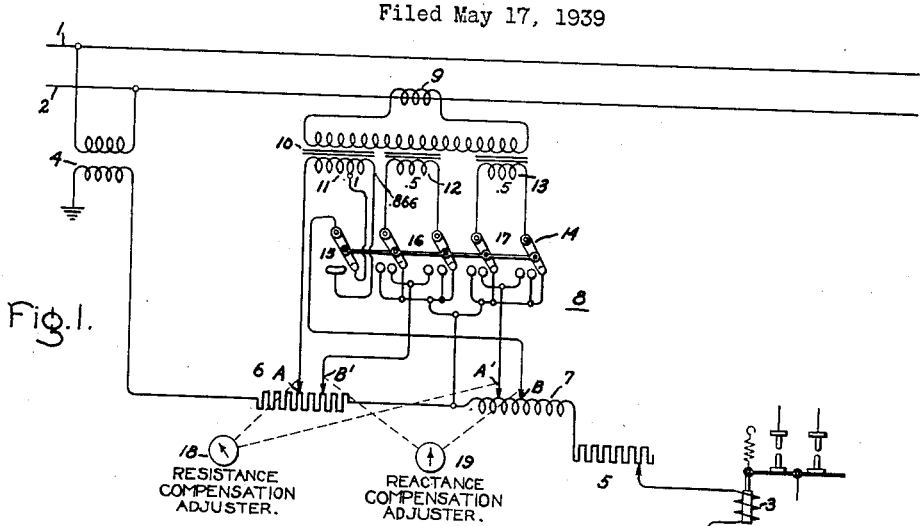

Oct. 22, 1940.                F. J. CHAMPLIN                2,218,672
                           LINE DROP COMPENSATOR
                            Filed May 17, 1939

Inventor:
Franklin J. Champlin,
by Harry E. Dunham
His Attorney.

Patented Oct. 22, 1940

2,218,672

UNITED STATES PATENT OFFICE 2,218,672

LINE DROP COMPENSATOR

Franklin J. Champlin, Dalton, Mass., assignor to General Electric Company, a corporation of New York Application May 17, 1939, Serial No. 274,216

5 Claims. (Cl. 171—119)

This invention relates to line drop compensators and more particularly to improvements in universal type line drop compensators.

A conventional line drop compensator is a device for compensating a voltmetric element which measures the voltage of a main circuit for the voltage drop in that circuit. Usually, that voltage drop has both resistance and reactance components and therefore the compensator introduces in the circuit of the voltmetric element resistance and reactance voltage drop components proportional respectively to the resistance and reactance voltage drops in the main circuit.

A universal type line drop compensator is one which gives correct line drop compensation regardless of the phase angle relation between the voltage of the main circuit which is applied to the potential circuit of the line drop compensator and the current derived from the main circuit which is circulated in the current circuit of the line drop compensator at unity power factor on the main circuit. For single phase main circuits this angle is zero, while for three phase main circuits in which the potential circuit of a line drop compensator is connected to measure the voltage between two of the lines of the main circuit and the current circuit of the line drop compensator is energized in proportion to the current in one of those two lines, the angle is ±30 degrees depending upon the phase rotation of the main circuit or upon which of the two lines the current circuit of the line drop compensator is energized from. For other kinds of circuits there will be other angles.

In an application of William W. Kuyper, Serial No. 102,221, filed September 23, 1936 (now Patent 2,147,490 dated February 14, 1939) and assigned to the assignee of the present application, there is disclosed and claimed a universal type line drop compensator which corrects for the phase difference between the potential and current circuits of the line drop compensator at unity power factor on the main circuit by employing four separate and distinct voltage drop components. Two of these components are resistance voltage drop components and two of them are reactance voltage drop components. One of the resistance voltage drop components taken with one of the reactance voltage drop components produces the correct resistance compensation and the remaining reactance voltage drop component taken with the remaining resistance voltage drop component produces the correct reactance compensation. The magnitudes of the resistance and the reactance voltage drop components are proportional to the resistance and the reactance voltage drops in the main line multiplied by functions of the phase angle relation between the potential and current circuits.

For example, in the specific case of a three phase main circuit in which the cosine of the 30 degree phase displacement is 0.866 and the sine of the 30 degree phase displacement is 0.5, the resistance compensation is produced by a voltage drop component proportional to 0.866 times the resistance voltage drop in the main circuit taken with a reactance voltage drop component which is proportional to 0.5 times the resistance voltage drop in the main circuit and the reactance compensation is produced by a voltage drop component which is proportional to 0.866 times the reactance voltage drop in the main circuit taken with a resistance voltage drop component which is proportional to .5 times the reactance voltage drop in the main circuit. The magnitudes of the first two voltage drop components are adjustable simultaneously and proportionately for adjusting the amount of resistance compensation and the last two voltage drop components are adjustable simultaneously and proportionately for adjusting the amount of reactance compensation. The 0.5 voltage drop components have opposite signs and their signs are reversible depending upon whether the 30 degree angle is an angle of lead or an angle of lag. Specifically, when the current in the current circuit lags the potential of the potential circuit by 30 degrees, the compensator voltage must be advanced 30 degrees in order to secure correct line drop compensation and in that case the first-mentioned 0.5 valued voltage drop component has a positive sign with respect to the signs of the 0.866 valued voltage drop components and the second 0.5 valued voltage drop component has a negative sign. For a thirty degree leading current in the current circuit the compensator voltage must be shifted 30 degrees in a lagging or negative direction to secure correct line drop compensation and in that case the signs of the 0.5 valued voltage drop components are reversed.

In the above referred to Kuyper application the four voltage drop components are produced in four separate impedance elements, two of which are resistors and two of which are reactors, by passing the same current through all of them and the change-overs from the unity values necessary for single phase (zero phase angle difference) compensation to the 0.866 and ±0.5 values necessary for three-phase (30 degree phase angle difference) is made by means of special and variable ratioed potential transformers controlled by suitable switching means.

In an improvement on the Kuyper application, Serial No. 251,992, filed January 20, 1939 in the name of Willard J. McLachlan and assigned to the assignee of the present application, an adjustable current which is proportional in magnitude to the desired amount of resistance compensation is passed through a 0.866 valued resistance element and a 0.5 valued reactance element so as to produce voltage drop components giving the correct resistance compensation and a second adjustable current proportional to the desired amount of reactance compensation is passed through a 0.866 valued reactance element and a 0.5 valued resistance element so as to produce voltage drop components giving the correct amount of reactance compensation.

In accordance with the illustrated embodiments of this invention the compensator has a single resistor and a single reactor as in conventional single phase line drop compensators of the resistance and reactance type, and the necessary unity, 0.866 and 0.5 valued voltage drop components are produced therein by a special current transformer arrangement for circulating selectively unity valued, 0.866 valued and ±0.5 valued, currents through properly proportioned portions of the resistance and reactance elements of the compensator.

An object of the invention is to provide a new and improved line drop compensator.

Another object of the invention is to provide a novel and simple universal resistance and reactance type line drop compensator.

The invention will be better understood by reference to the following description taken in connection with the accompanying drawing and its scope will be pointed out in the appended claims.

Figure 2:
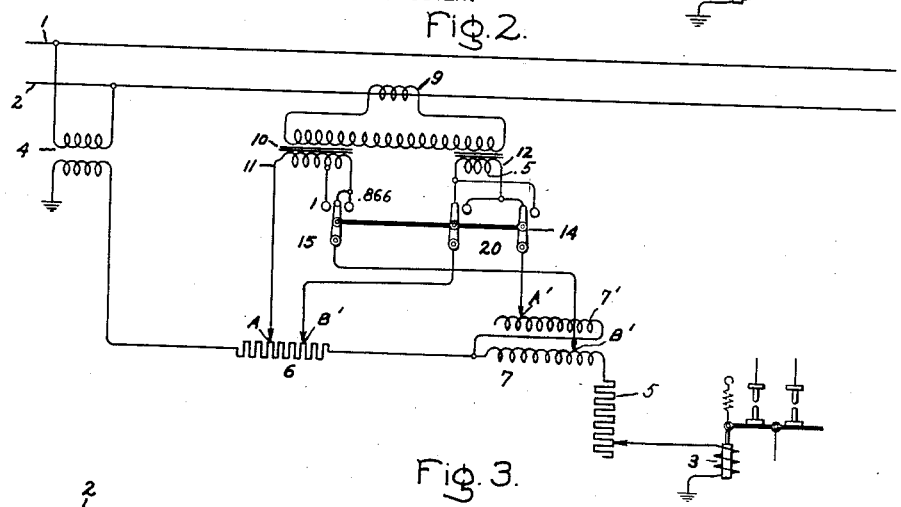
Figure 3:
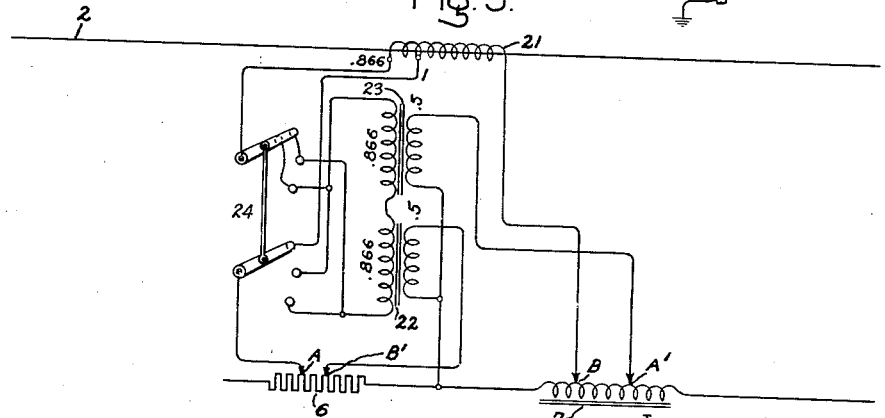

In the drawing Fig. 1 is a diagrammatic showing of an embodiment of the invention, Fig. 2 is a modification employing positive and negative connected reactance elements, and Fig. 3 is another modification employing a different current transformer arrangement to obtain the 0.5 valued currents.

Referring now to the drawing and more particularly to Fig. 1, there is shown therein a main circuit having conductors 1 and 2, the voltage between which is measured by a voltmetric device 3 in the form of a voltage regulating relay. This relay is connected across the main circuit through a potential transformer 4 and in series therewith there is connected a conventional ballast resistor 5 together with a resistance element 6 and a reactance element 7 of a line drop compensator 8. This series circuit constitutes the potential circuit of the line drop compensator. The current circuit of the line drop compensator is energized by a current transformer 9 connected in conductor 2 of the main circuit. This current transformer is connected to energize a special multi-secondary current transformer 10 having secondary windings 11, 12 and 13. Each of these secondary windings preferably has its own iron core so that the current in any one or more of them is not influenced by the impedance connected in circuit with the others. Winding 11 has a unity current output tap and a 0.866 current output tap and windings 12 and 13 each have the proper number of turns so as to produce 0.5 valued current outputs with respect to the unity current output of winding 11.

For readily adapting the compensator to single phase and "plus" and "minus" three-phase operation, there is provided a multiple three-position switch 14 which is shown by way of example as consisting of three mechanically interconnected triple-throw switches 15, 16 and 17. The switch 14 is shown in its single phase position in which switches 16 and 17 short circuit the secondary windings 12 and 13 respectively and switch 15 connects the winding 11, through its unity current output tap, to adjustable points A and B on the resistor 6 and the reactor 7 respectively. The position of point A is adjusted by a schematically illustrated resistance compensation adjuster 18 and the position of point B is adjusted by a schematically illustrated reactance compensation adjuster 19.

When switch 14 is moved to its mid-position the switch 15 connects the points A and B across the winding 11 through its 0.866 valued tap, the switch 16 connects the 0.5 valued winding 12 across that portion of the resistor 6 determined by the position of an adjustable connection point B', and the switch 17 connects the 0.5 valued winding 13 across that portion of the reactor 7 determined by the position of an adjustable connection point A'. If the polarities of all of the secondary windings 11, 12 and 13 are the same, it will be observed that the direction of current flow produced by the winding 13 through the portion of the reactor 7 determined by the position of the connection A' will be in the opposite direction with respect to the other currents. Consequently, this direction will be considered negative and the direction of the other currents will be considered positive. If now the switch 14 is moved to its right hand position the only change is that the switches 16 and 17 reverse the relative directions of the 0.5 valued currents in the portions of the resistor 6 and reactor 7 determined respectively by the points B' and A'.

The position of point A' is such as to include in its circuit an amount of the reactor 7 which is numerically equal in ohms to the amount of the resistor 6 included by point A in its circuit and A' is simultaneously and proportionately adjustable with A by means of the resistance compensation adjuster 18. Similarly, the amount of the resistor 6 included by the point B' in its circuit is numerically equal to the amount of the reactor 7 included by point B in its circuit and the position of point B' is simultaneously and proportionately adjustable with point B by means of the reactance compensation adjuster 19.

The operation of Fig. 1 is as follows: With the switch 14 in the position shown in the drawing, unity valued current flows from the unity tap of the winding 11 through the portions of the resistor 6 and reactor 7 included between the points A and B. If then the position of point A is adjusted so as to have this unity current flow through an amount of resistance proportional to the resistance of the main circuit by means of the adjuster 18 and if the point B is adjusted by means of the adjuster 19 to have this current flow through a portion of the reactor 7 proportional to the reactance of the main circuit, the voltage drops in 6 and 7 between points A and B will be proportional respectively to the resistance and reactance voltage drops in the main circuit and if conductors 1 and 2 represent a single phase circuit correct line drop compensation will be obtained.

If, however, it is assumed that conductors 1 and 2 are two of the conductors of a three-phase circuit correct line drop compensation will not be obtained because the current in the conductor 2 will be 30 degrees out of phase from the voltage between conductors 1 and 2 at unity power factor. Under these conditions correct compensation can be obtained by moving the switch 14 to either its middle or its right hand position depending upon whether the 30 degree angle is an angle of lead or an angle of lag. Thus, the resistance compensation will be produced by a 0.866 valued resistance voltage drop produced by the 0.866 valued current output of the winding 11 flowing in the portion of the resistor 6 determined by point A taken together with the 0.5 valued reactance voltage drop produced by the 0.5 valued current flowing in the portion of the reactor 7 determined by the point A'. Similarly, the correct reactance compensation will be produced by the 0.866 valued reactance voltage drop produced by the 0.866 valued current output of the winding 11 flowing in the portion of the reactor 7 determined by the point B taken with the 0.5 valued resistance voltage drop caused by the 0.5 valued current flowing in the portion of the resistor 6 determined by the point B'.

This compensation will be correct for any power factor of the main circuit.

It is not necessary to use separate current transformers 9 and 10 and obviously the current transformer 9 may be omitted and the primary winding of the current transformer 10 inserted directly in the line conductor 2.

In the modification shown in Fig. 2, the secondary winding 13 of the current transformer 10 is omitted and reversal of the sign of the voltage drop component in the portion of the resistor 6 determined by the position of the point B' is obtained by a polarity reversing switch 20 which replaces the two switches 16 and 17 of Fig. 1. The difference in sign between the resistance and reactance voltage drop components determined by the points A' and B' is obtained by an additional reactor 7' which is arranged to induce a voltage of the proper polarity in the reactor 7 by transformer action. From the connections it will be clear that the operation of the reversing switch 20 will also reverse the polarity of the reactance voltage drop whose magnitude is determined by the point A'.

In Fig. 3 the change consists in the arrangement for securing the reversible sign 0.5 valued resistance and reactance voltage drop components. In this figure the current transformer 9 is replaced by a current transformer 21 having a unity valued tap and a 0.866 valued tap for connecting this current transformer across the points A and B. The 0.5 valued current introduced into the resistor 6 at point B' is obtained by an auxiliary current transformer 22 which transforms its 0.866 valued primary current to a 0.5 valued secondary current. Similarly, the 0.5 valued current introduced into the reactor 7 at point A' is obtained from another auxiliary transformer 23 having such a ratio that its 0.866 valued primary current becomes a 0.5 valued secondary current. Simultaneous reversal of the signs of the 0.5 valued resistance and reactance voltage drop components is obtained by a reversing switch 24 which reverses the polarities of the primary windings of the auxiliary transformers 22 and 23.

It will, of course, be understood that in Figs. 2 and 3 the points A and A' are operated by the resistance compensation adjuster 18, as shown in Fig. 1, in order to adjust the amount of resistance compensation and the points B and B' are adjusted by the reactance compensation adjuster 19, as shown in Fig. 1, for adjusting the amount of reactance compensation.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In a line drop compensator, a potential circuit containing a resistor and a reactor in series, said potential circuit being energized in accordance with the potential of a main circuit whose line drop is to be compensated for, a current circuit energized in proportion to the current in said main circuit, said main circuit current making an angle θ with said potential of said main circuit when the power factor of said circuit is unity, means for passing through a portion of said resistor proportional in magnitude to the resistance of said main circuit a current having a value proportional to the current energizing said current circuit multiplied by cosine θ, means for passing through a portion of said resistor proportional in magnitude to the reactance of said main circuit a current equal to the current energizing said current circuit multiplied by sine θ, means for passing through a portion of said reactor proportional in magnitude to the reactance of said main circuit a current equal to the current energizing said current circuit multiplied by cosine θ, and means for passing through a portion of said reactor proportional in magnitude to the resistance of said main circuit a current equal to the current energizing said current circuit multiplied by sine θ.

2. In a line drop compensator, a potential circuit containing a resistor and a reactor in series, said potential circuit being energized in accordance with the potential of a main circuit whose line drop is to be compensated for, a current circuit energized in proportion to the current in said main circuit, said main circuit current making an angle θ with the potential of said main circuit, means for passing through a portion of said resistor corresponding in magnitude to the resistance of said main circuit a current having a value proportional to the current energizing said current circuit multiplied by cosine θ, means for passing through a portion of said resistor corresponding in magnitude to the reactance of said main circuit a current equal to the current energizing said current circuit multiplied by sine θ, means for passing through a portion of said reactor corresponding in magnitude to the reactance of said main circuit a current equal to the current energizing said current circuit multiplied by cosine θ, means for passing through a portion of said reactor corresponding in magnitude to the resistance of said main circuit a current equal to the current energizing said current circuit multiplied by sine θ, and means for simultaneously and equally adjusting the magnitude of the portions of said resistor and reactor which are proportional in magnitude to the resistance of the main circuit, and means for simultaneously and equally adjusting the magnitude of the portions of said reactor and resistor which correspond in magnitude to the reactance of the main circuit.

3. A line drop compensator for use with alternating current systems comprising, resistance and reactance connected in series, current transforming means provided with three secondary windings, two of said windings having equal turns such that their individual currents are to the current of the remaining winding as sin θ is to cos θ where θ is any predetermined angle, said remaining winding having a unity current tap, switching means having a first position in which said remaining secondary winding is connected between adjustable points on said resistance and reactance by way of its unity current tap, said switching means having a second position in which the connection made in said first position is completed through the entire remaining winding and in which the equal secondary windings are respectively connected to additional adjustable points on said resistance and reactance in such a manner as to produce voltage drops of opposite sign, said switching means having a third position for reversing the signs of said voltage drops, means for simultaneously adjusting the position of the first mentioned point on said resistance and the last mentioned point on said reactance, and means for simultaneously adjusting the position of the first mentioned point on said reactance and the last mentioned point on said resistance.

4. A line drop compensator for use with alternating current systems comprising, resistance and reactance connected in series, current transforming means provided with two secondary windings, the currents of said secondary windings being in the ratio of 0.866:0.5, the 0.866 current winding having a unity tap, switching means having a first position in which the winding having the unity tap is connected between adjustable points on said resistance and said reactance by way of said tap, said switching means having a second position in which the connection made in said first position is completed through the entire winding and in which the 0.5 valued current secondary winding is connected to adjustable points on said resistance and reactance in a manner to produce opposite sign voltage drops therein, said switching means having a third position for reversing the signs of said voltage drops, means for simultaneously adjusting the position of the first mentioned point on said resistance and the last mentioned point on said reactance, and means for simultaneously adjusting the position of the first mentioned point on said reactance and the last mentioned point on said resistance.

5. A line drop compensator for use with alternating current systems comprising, resistance and reactance connected in series, a current transformer having a secondary winding provided with taps for producing output currents which are in the ratio of 1:0.866, means for connecting said secondary winding to adjustable points on said resistance and reactance by way of said 0.866 valued tap, a pair of auxiliary current transformers having their primary windings connected in series with the secondary winding of said first mentioned current transformer, said auxiliary current transformers having a primary to secondary current ratio of 0.866:0.5, means for connecting the secondary winding of one auxiliary current transformer to an adjustable point on said resistance, means for connecting the secondary winding of the other auxiliary current transformer to an adjustable point on said reactance, means for selectively reversing the polarities of said auxiliary current transformers, means for simultaneously adjusting the position of the first mentioned point on said resistance and the last mentioned point on said reactance, and means for simultaneously adjusting the position of the first mentioned point on said reactance and the last mentioned point on said resistance.

FRANKLIN J. CHAMPLIN.